United States Patent
Edney

(10) Patent No.: US 9,052,739 B2
(45) Date of Patent: Jun. 9, 2015

(54) METHOD AND APPARATUS FOR VIRTUALIZING HARDWARE DONGLE OVER A WIRELESS CONNECTION

(71) Applicant: Atmel Corporation, San Jose, CA (US)

(72) Inventor: Jon Edney, Cambridgeshire (GB)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/888,262

(22) Filed: May 6, 2013

(65) Prior Publication Data

US 2013/0326095 A1 Dec. 5, 2013

Related U.S. Application Data

(63) Continuation of application No. 13/168,435, filed on Jun. 24, 2011, now Pat. No. 8,438,319.

(60) Provisional application No. 61/358,358, filed on Jun. 24, 2010.

(51) Int. Cl.
| | |
|---|---|
| *G06F 13/42* | (2006.01) |
| *G06F 3/00* | (2006.01) |
| *G06F 5/00* | (2006.01) |
| *G06F 13/00* | (2006.01) |
| *H05K 7/10* | (2006.01) |
| *G06F 9/44* | (2006.01) |

(52) U.S. Cl.
CPC .. *G06F 3/00* (2013.01); *G06F 5/00* (2013.01); *G06F 13/00* (2013.01); *G06F 13/42* (2013.01); *H05K 7/10* (2013.01); *G06F 9/4413* (2013.01)

(58) Field of Classification Search
CPC ............ H04B 1/38; G06F 13/36; G06F 3/00; G06F 15/16
USPC ............................................................. 710/11
See application file for complete search history.

(56) References Cited

U.S. PATENT DOCUMENTS

| | | | |
|---|---|---|---|
| 6,643,748 B1 | 11/2003 | Wieland | |
| 7,917,638 B1 | 3/2011 | Appelman et al. | |
| 2002/0083228 A1* | 6/2002 | Chiloyan et al. | 710/9 |
| 2004/0122649 A1* | 6/2004 | Bartek et al. | 703/23 |
| 2005/0015534 A1* | 1/2005 | Wu | 710/306 |
| 2005/0063328 A1 | 3/2005 | Dunagan et al. | |
| 2005/0120138 A1* | 6/2005 | Carmello et al. | 709/245 |
| 2006/0227753 A1 | 10/2006 | Vleugels et al. | |
| 2007/0038787 A1 | 2/2007 | Harris et al. | |
| 2007/0288568 A1 | 12/2007 | Hayter | |
| 2008/0070516 A1 | 3/2008 | Lee et al. | |
| 2008/0071962 A1 | 3/2008 | Yang et al. | |
| 2008/0195765 A1* | 8/2008 | Xie et al. | 710/10 |

* cited by examiner

*Primary Examiner* — Farley Abad
(74) *Attorney, Agent, or Firm* — Fish & Richardson P.C.

(57) ABSTRACT

In a computer system configured to handle I/O signals received by the computer system from input devices and/or output signals output by the computer system, a virtual attachment module includes logic for selecting such that program code for coupling can alter the operating system's selection of I/O devices used for particular I/O device operations, coupling to a wireless I/O device at least for determining whether the wireless I/O device is available, and causing redirection of I/O signals destined to a default I/O device to be to the wireless I/O device, if the program code for coupling determines that the wireless I/O device is available. A virtual connection module could be used to intercept system messages indicating a wireless device is present and connected, determine whether the wireless device is present and/or connected, and determine which intercepted messages to forward, drop, delay or reformulate.

18 Claims, 7 Drawing Sheets

METHOD AND APPARATUS FOR VIRTUALIZING HARDWARE DONGLE OVER A WIRELESS CONNECTION

CROSS-REFERENCES TO RELATED APPLICATIONS

This application is a continuation of U.S. Provisional Patent Application No. 61/358,358 filed on Jun. 24, 2010, which is incorporated by reference in its entirety for all purposes.

This application is a continuation of the U.S. patent application Ser. No. 13/888,262 filed May 6, 2013, which claims the benefit of the U.S. Provisional Patent Application No. 61/358,358 filed on Jun. 24, 2010, which is incorporated by reference in its entirety for all purposes.

FIELD OF THE INVENTION

The present invention relates to hardware interfacing to operating system controls in general and more particularly to interfaces wherein a computer's operating system performs actions based on whether a hardware interface device has been inserted or appears to be present.

BACKGROUND OF THE INVENTION

Wireless communication among electronic devices has been increasing as the benefits and conveniences of wireless communication become more preferred. Many computers (laptops, desktops, smart phones, handheld devices, etc.) are equipped with wireless capability. Many computers are also equipped with hardware expansibility, such as Bluetooth™ interfaces and Universal Serial Bus (USB) interfaces usable to connect peripherals and other hardware devices with the computer.

In a computer having plug-and-play ("PnP") capabilities, a host interfaces to a PnP software driver that signals to the operating system when devices are attached and detached from the computer, signals the identity of the type of device and possibly the particular instance of that type of device and handles the loading and unloading of device drivers accordingly. Using this PnP functionality, a user can simply plug in a device, known to the computer or previously unknown to the computer, and the PnP layer will load the appropriate drivers (or ask them) so that the operating system services can access the installed device.

As used herein, "dongle" refers to a device commonly used to add wireless connectivity to a personal computer or other computer embedded (CE) device, or additional functionality provided elsewhere. A CE device can be any kind of electronic appliance that has embedded computer technology. Examples of CE devices include, but are not limited to, personal computers, notebooks, set top boxes, home entertainment systems, TVs, game consoles, music players, media servers, cellular phone and/or smart phones. A typical dongle might have a USB plus, range in size from about thumbnail size to thumb size, and have an internal or external antenna for wireless communication. Typically, upon being plugged into a USB socket of a computer, keyboard, set-top box or other CE device that has a USB socket, the dongle connects to the USB bus of the CE device. This connection is then detected by a USB host of the CE device, which determines the device instance (which particular device that is) and/or device type, and may signal for loading of appropriate drivers for that device type. When the dongle is plugged into a CE device, it can provide a wireless transceiver function. Dongles might provide connectivity for wireless peripherals such as wireless mice, key boards, audio headphones or audio headsets, or the like. In the example of a wireless mouse, when the dongle is plugged in and the wireless mouse turned on, the mouse communicated through the dongle and is recognized by the computer. The operating system loads the necessary software to allow the mouse to move the screen cursor and perform other mouse action. Specifically, the wireless mouse detects user movements and button selections and conveys input signals to the dongle corresponding to those user actions. The dongle conveys the inputs to the USB bus and the USB functionality of the CE device moves that data within the CE device to be available to applications and other elements of the CE device.

In general, dongles can be used for may interfaces wherein attaching a dongle results in the dongle connecting to the bus driver and triggering the computer's operating system to assume that a new device is plugged in and in turn triggers the operating system to run some "connecting processing" routine, such as Microsoft® Windows™ operating system PnP routine, or a signal rerouting. In some operating system, such a Apple's MAC OS X™, attaching a dongle might change some settings so that a new device is mounted.

The approach of signaling when the device is attached and detached makes sense to users, since there is a physical act that precedes actions taken by the operating system, such as the operating system presenting a message "New storage media found" and searching for content following the user inserting a thumb drive having content thereon.

In the case where the dongle provides wireless connectivity to devices, the dongle may act as a network adapter or it may represent itself to the USB host as the actual wireless device that can connect to it. If the dongle is a network adapter, then the insertion of the dongle is detected by the PnP subsystem and the driver for a network adapter is loaded. When a Bluetooth™ device connects to the dongle, then this is signaled as a separate device and the appropriate driver for the Bluetooth™ device is loaded. However, if the dongle is intimately tied to the wireless device that can connect to it, then the insertion of the dongle typically causes the driver for that specific wireless device to be loaded. This behavior is often times desirable as wireless connections may fade in and out without interrupting a user's task (so long as the fade is not too long), and it could be disruptive to alert the user each time there is a change of state. This is not an issue with wired devices In general, where a device connects wirelessly to peripherals or other devices over short links often referred to as forming a "personal area network" or "PAN," the device may use an external interface unit that is plugged into or onto the device. For example, where the device is a laptop, the circuitry might be provided by a USB dongle that attaches to a USB port of the laptop. The USB dongle contains the radio circuitry needed to communicate wirelessly over the short wireless links. The Bluetooth™ interface is one such standard interface. The Ozmo Devices interface is another such interface.

In some cases, it might be desirable to reduce the amount of hardware in use and, in the above scenarios, the lack of a physical dongle provides undesirable results, such as the inability to tie operation of the dongle with the insertion of the dongle and to assume constant connections when the dongle is inserted.

BRIEF SUMMARY OF THE INVENTION

In some embodiments of the present invention, a plug-and-play ("PnP") driver is provided that detects the presence or absence of wireless devices over a wireless channel and reports this information, and possibly other information about the device, to the PnP subsystem so that the PnP subsystem can load or unload the appropriate driver for those devices at the appropriate time. The PnP driver thus simulates a physical dongle, but obtains its traffic into and out of the computer over a wireless channel via a wireless networking interface and signals an operating system to simulate the attachment and detachment of a virtual dongle to cause the operating system to trigger actions that would correspond with the attachment and detachment of a physical dongle coupled to a port of the computer.

In some specific embodiments of the present invention, a PnP driver presents the wireless device to the PnP subsystem in such a manner that it is able to make use of existing USB function drivers. As an example, when a wireless peripheral device connects, the PnP driver creates a physical device object to represent this to the PnP subsystem. In response, the PnP subsystem loads the appropriate USB function drivers to handle the wireless peripheral device. The USB function driver can be unaware that it is communicating to a peripheral device wirelessly rather than over the USB bus and still operate properly. Once connected, data from the wireless peripheral device are presented as regular USB data to the USB function driver.

In some embodiments of the present invention, a PnP driver stimulates attachment and detachment of a physical dongle where the signaling provided to the PnP subsystem can be independent, under at least one condition, from an actual state of a physical device supported by the PnP driver or from the state of the wireless channel. This allows the PnP driver to maintain the correct functionality from the perspective of the PnP subsystem regardless of whether or not the wireless channel is operable. For example, where the actual state of the channel is that it is operable, the PnP driver could signal that the simulated device was attached or that the simulated device was detached, and where the actual state of the channel is that it is not operable, the PnP driver could signal that the simulated device was attached or that the simulated device was detached. Also, the PnP driver can delay notifications and skip some notifications where the state of the channel changes and reverts to its original state. For example, where the channel momentarily becomes inoperable by then returns to operability within less than a threshold time, the PnP driver can skip notifications of those two events.

Other objects, features, and advantages of the present invention will become apparent upon consideration of the following detailed description and the accompanying drawings, in which like reference designations represent like features throughout the figures.

DESCRIPTION OF THE DOCUMENT

The present disclosure describes methods and apparatus for operating and using virtual dongle drivers to replace functionality provided by hardware dongles that add functionality to a computer system.

In the general example, references to a computer system can be references to computing devices which are portable and/or mobile computing devices and/or communications devices with some computing capability. Examples of computing devices include laptop computers, desktop computers, handheld computing devices, pagers, cellular telephones, devices with embedded communications abilities and the like. Examples of peripheral devices include typical computer, telephone, etc. accessories where wireless connections are desired, but might also include less common devices, such as wearable devices that communicate with other devices on a person or even communicate with other nearby devices. For example, two people could exchange information between their wearable computers without wires, by transmission through the air, or using their bodies and/or clothing.

The computing devices may interface to IEEE 802.11 WLANs (Wireless Local Area Networks), or other wireless networks to communicate with other network nodes, including nodes accessible through wired connections to the wireless network (typically via an access point). The computing devices also may interface to PAN devices over a personal area network (PAN), such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In many examples herein, the plug-and-play ("PnP") functionality is USB PnP, but these examples might be expanded to non-USB PnP or analogous systems upon reading this disclosure.

Examples of the concepts and disclosures provided above will now be further explained with reference to the figures. In the figures, like items are referenced with a common reference number with parenthetical numbers to indicate different instances of the same or similar objects. Where the number of instances is not important for understanding the invention, the highest parenthetical number might be a letter, such as in "100(1), 100(2), . . . , 100(N)." Unless otherwise indicated, the actual number of items can differ without departing from the scope of this disclosure.

Figure 1:
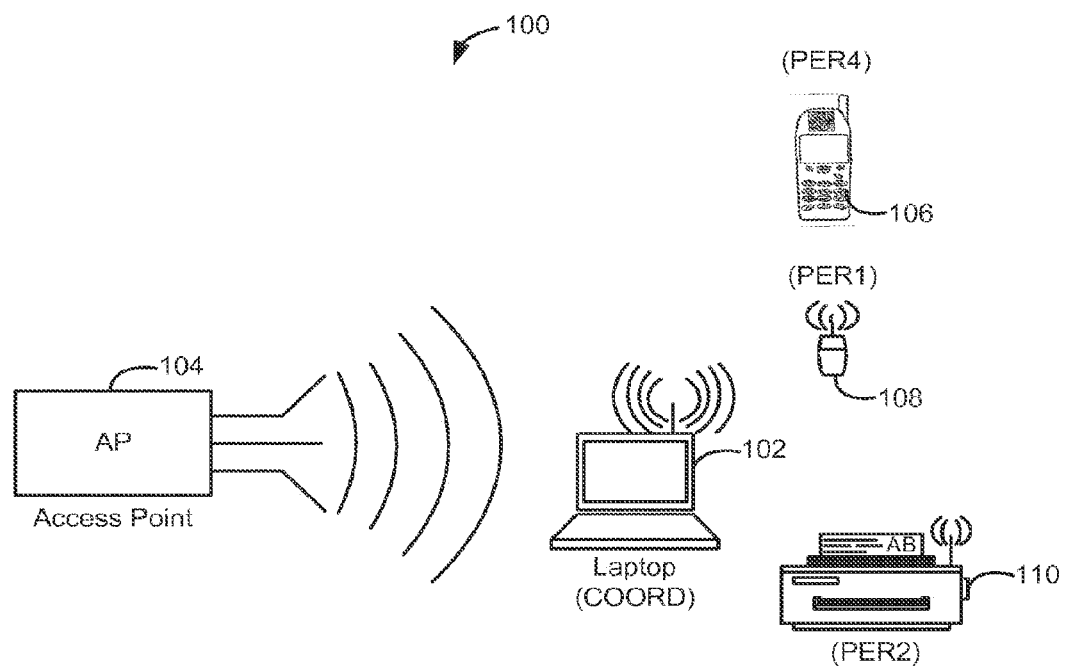
FIG. 1 is a block diagram illustrating elements of a computer and devices that communicate with the computer, according to aspects of the embodiments disclosed herein.
Figure 1:

Specifically, FIG. 1 illustrates various devices that might operate together. As shown there, a laptop 102 has wireless capability to interface with an access point 104, a cell phone 106, a mouse 108, a printer 110 and a wireless headset 112. Each of these devices can be in communication with laptop 102 using the wireless link, either as conventional 802.11 devices or using an overlay protocol such as described in Vleugels I. Instead of a laptop, another CE device might be used. In FIG. 1, elements are shown with an antenna to indicate that they can communicate wirelessly, but it should be understood that an external antenna is not required. Other network components and additional instances might also be present. Wired components and peripherals (not shown), might also be present.

As is typically the case, when a peripheral is introduced to a laptop via a USB connection, a USB module might signal that connection to the operating system of the laptop. One response of the operating system is the invocation of a search for a suitable driver. Another response of the operating system is the re-routing of signals, such as might occur where the laptop has integrated speakers that are the sound output devices until a wired headset is plugged into the audio jack of the computer, of which point power and/or signals are removed from the speakers. Because of these responses, it might be inconvenient to the user if the responses are not triggered appropriately.

Figure 2:
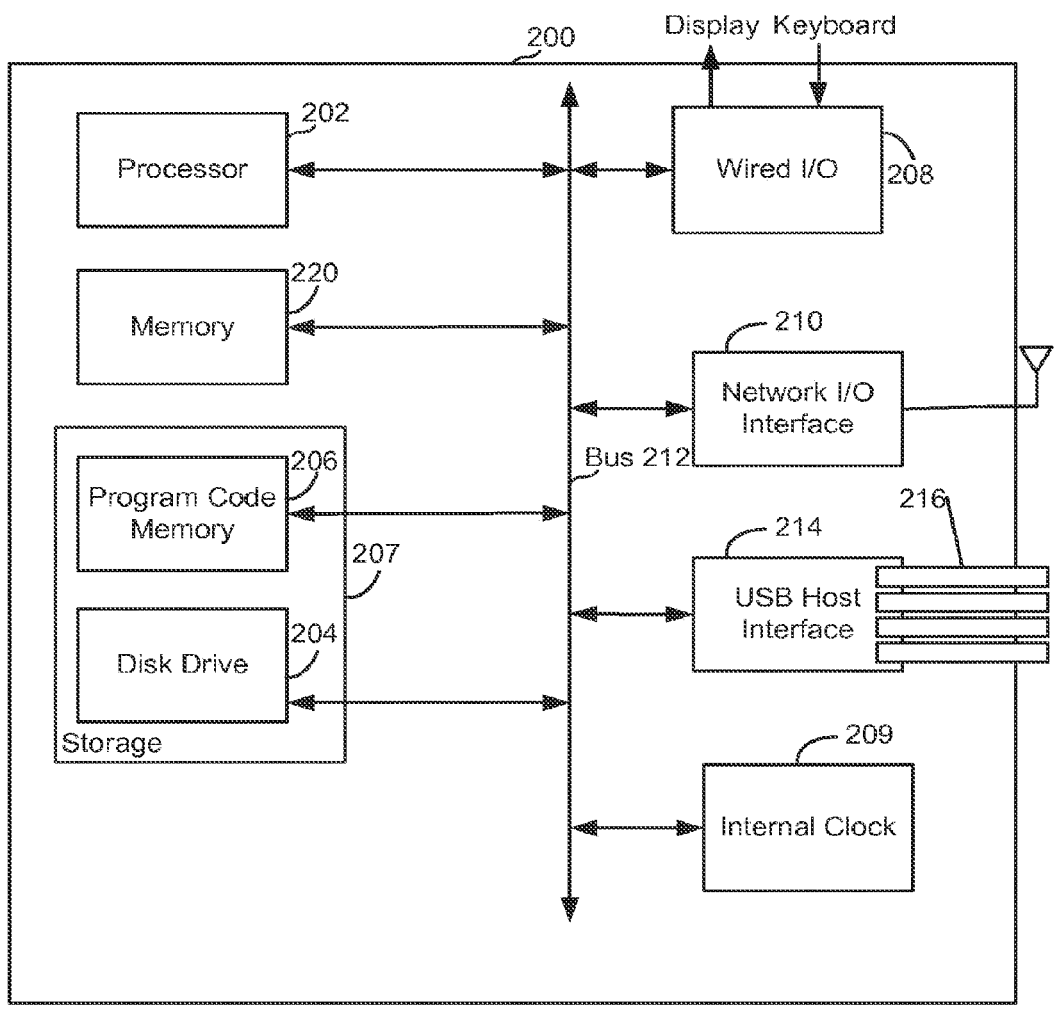
FIG. 2 is a block diagram of an example wireless personal area network (PAN) system.

FIG. 2 illustrates an example of the internal details of the laptop (but this could be for some other device instead) computer 200. As explained herein, such devices might include laptops, desktop computers, terminals, home entertainment systems, music devices, mobile phones, game consoles, network extenders or the like, that have capabilities of responding automatically to the attachment and detachment of peripherals and/or other electronic equipment or interfaces.

What is shown in FIG. 2 is one example. In this example, a computer 200 is shown comprising a processor 202, and a disk drive 204 and a program code memory 206 in program and software instruction storage 207, a wired input/output interface 208 for displays, keyboards and the like, an internal clock 209, and a network I/O interface 210, each coupled to a bus 212 for intercommunication. A USB Host interface 214 is also provided that can provide a path between devices attached to a USB connector 216 and processor 202 via bus 212.

Program and software instruction storage 207 might comprise program code memory 206 and disk drive 204. Program instructions for implementing computing, communication, etc. functions, as well as network interfacing, can be stored in a program code memory 206 and might be loaded in there from instructions stored on disk drive 204. Memory 220 might be just a portion of a common memory that also has program code memory 206 as a portion. For example, both memories might be allocated portions of RAM storage so that instructions and data used by programs are stored in one memory structure. With a general purpose, network-centric, signal processing-centric or other style of processor, functional modules that might be illustrated by blocks in a block diagram might be implemented entirely in software, embodied only in code stored in computer readable media. However, when executed as intended, the processor and the stored instructions perform the functions of those modules. For example, a device might be described as having a network stack that performs certain functions, but the network stack might not be represented in individual hardware elements. Computing and instruction processing of a given set of instructions might use conventional processor execution, instruction loading and storage, possibly optimized for the particular device.

Figure 3:
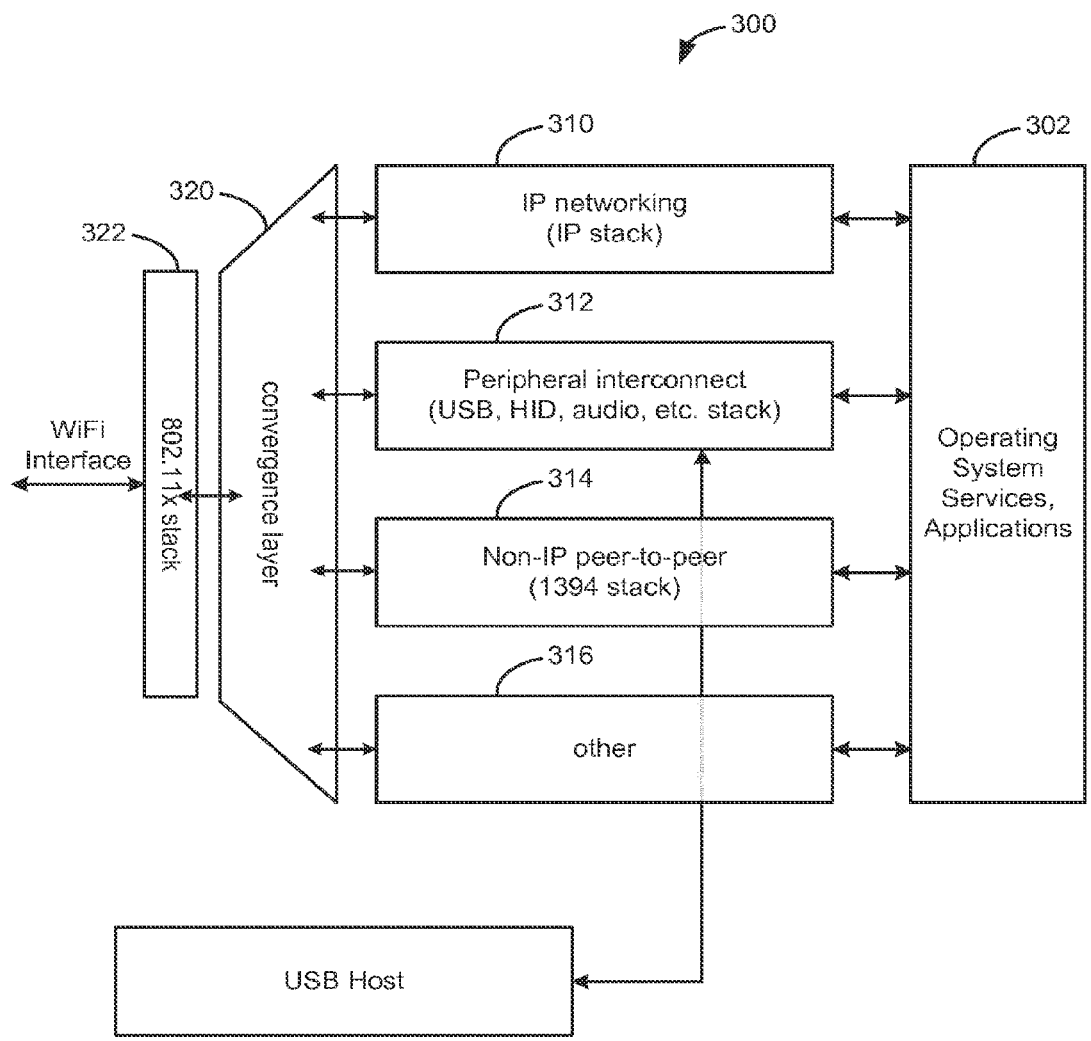
FIG. 3 is a block diagram of software components that might comprise software and/or logical constructs to interface applications.

FIG. 3 illustrates a platform 300 as it might be present in a dual-net device, that represents software and/or logical constructs that together or can be thought of as logical elements available for processing data within the computing device. As such, they need not be implemented as separate hardware components or distinct software components, so long as their functionality is available as needed. Other variations are possible, but in the layout shown, applications and operating system services (shown as block 302) are programmed to interface to various stacks, such as an IP networking stack 310 (sometimes referred to as an "IP stack"), a peripheral stack 312 (USB, HID, audio, etc.), a non-IP stack 314 (for IEEE 1394 interfacing or other stack 316. For example, an application such as an HTTP browser might expect to communicate using TCP/IP and thus that application would have been configured to communicate with the computing device's IP stack.

A convergence platform can be added between an IEEE 802.11x (x=a, b, g, n, etc.) stack 322 and the different drivers to enable multi-protocol support, expose and coordinate access to specific MAC service primitives and coordinate the priority handling in Quality-of-Service (QoS) sensitive applications. This convergence platform can be a separate software layer or can also be integrated within the IEEE 802.11x stack 322.

For certain stacks, additional services may be required that might not be supported inside the IEEE 802.11x stack 322. If that is the case, such overlay protocol services may reside either inside the convergence layer 320 or in between the convergence layer 320 and the respective stack. As an example, communication with peripherals may require protocol services in addition to the protocol services provided by the IEEE 802.11x stack 322 in order to meet the power and latency requirement typical of such applications. Such protocol services may be part of the convergence layer 320, or may reside in between the convergence layer 320 and the Peripheral Interconnect Stack 312. Of course, as an alternative, the IEEE 802.11x stack 322 may have been adapted to support such services.

Each of the stacks 310-316 is shown coupled to a convergence layer 320, which provides the necessary and/or optional conversions of data, protocol, timing, etc. so that each of the higher level stacks 310-316 are interfaced to an 802.11x stack 322. 802.11x stack 322 can then interface to the computing device's network card (or other network circuitry). In this manner, for example, IEEE 802.11x stack 322 might handle a browser's traffic that goes through IP stack 310 while also handling a mouse interface whose traffic goes through peripheral stack 312. Not that with a single 802.11x stack, a single network interface can carry traffic for more than one higher-level stack. The single network interface needs to be tuned to deal with the different requirements of the different stacks, when different requirements exist.

Figure 4:
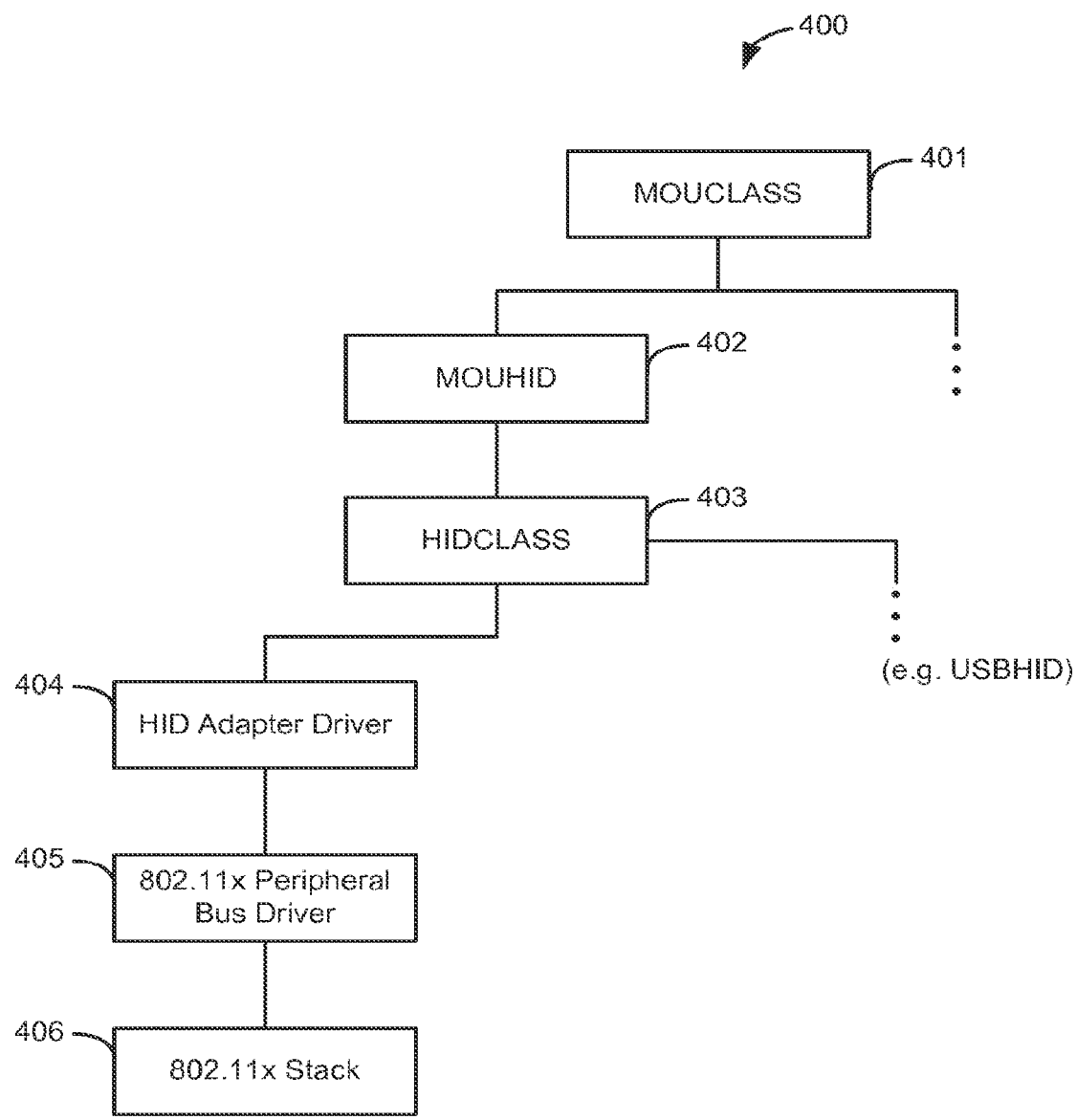
FIG. 4 is a block diagram of classes and objects that might be used in an interface between a network and applications.

An example of this is illustrated in FIG. 4 for a wireless PAN where a mouse is connected over the wireless channel to the standard HID class driver in a PC running on the Windows™ operating system (or other applicable Operating System (OS)). The driver or firmware resides between the IEEE 802.11x stack 406 and the standard HID class driver 403. In a specific implementation, the driver or firmware can constitute an HID adapter driver 404 and an 802.11x peripheral bus driver 405.

Other variations of what is shown in FIG. 4 are possible. For example, the IEEE 802.11x peripheral service function might connect up to MOUHID driver 402 directly. In that case, HID adapter driver 404 is written as an HIDCLASS miniport driver. This HID adapter driver then layers under the MOUHID 402 and MOUCLASS 401 drivers and allows mouse data to be injected into the operating system.

Alternatively, HID adapter driver 404 may be a bus driver that creates a representation of the device on a software bus in such a way that USB function drivers that are available to the operating system, or can be made available through operating system modifications, can be layered above it.

In specific embodiments, the IEEE 802.11x peripheral service function and adapter driver may be combined in a single driver. Alternatively, two separate drivers may be used and an interface might be defined and used between both drivers.

The HID adapter driver 404 receives the IEEE 802.11x frames from the IEEE 802.11x peripheral service function that are intended for the higher layer driver (e.g., MOUCLASS driver 401). Similarly, the HID adapter driver 404 receives frames from the higher layer driver that are to be transmitted to a PER using the IEEE 802.11x circuitry. The HID adapter driver 404 and IEEE 802.11x peripheral service function generate and decode the necessary packet header for running a specific application, like the HID protocol, over an IEEE 802.11x data channel. For example, it removes the IEEE 802.11x-specific MAC header and performs the necessary manipulation to transform it in the correct format to be passed on to the respective class driver.

Specific Implementation

Software herein might be used with WPAN that enables peripherals to connect to a Wi-Fi-enabled host using the IEEE 802.11x protocol. Using a particular protocol with data type IEEE 802.11x frames and with IEEE 802.11x basic access procedures, a bi-directional data path is provided between a peripheral and the Wi-Fi-enabled host. One example of such and IEEE 802.11x protocol is the protocol defined by the Wi-Fi Certified™ Wi-Fi Direct specification. Another example might be the IEEE 802.11x protocol supported by the Win7™ SoftAP™ or Intel MyWiFi™ technology. Other protocols are also possible. Software for such operations might be divided into two components: host-side software and device-side software.

The host-side software might run on a Wi-Fi-enabled host that supports Intel MyWiFi™ or Win7™ SoftAP™ functionality. The embedded software might run within the peripheral device, such as a device based on a CAST™ RX8051™ embedded core. The host-side software is responsible for managing the communications link to the peripheral device and interfacing the WPAN to the USB device driver appropriate for the class of service. It presents the device to the PnP manger in such a manner that it is able to make use of existing or newly created USB function drivers.

Figure 5:
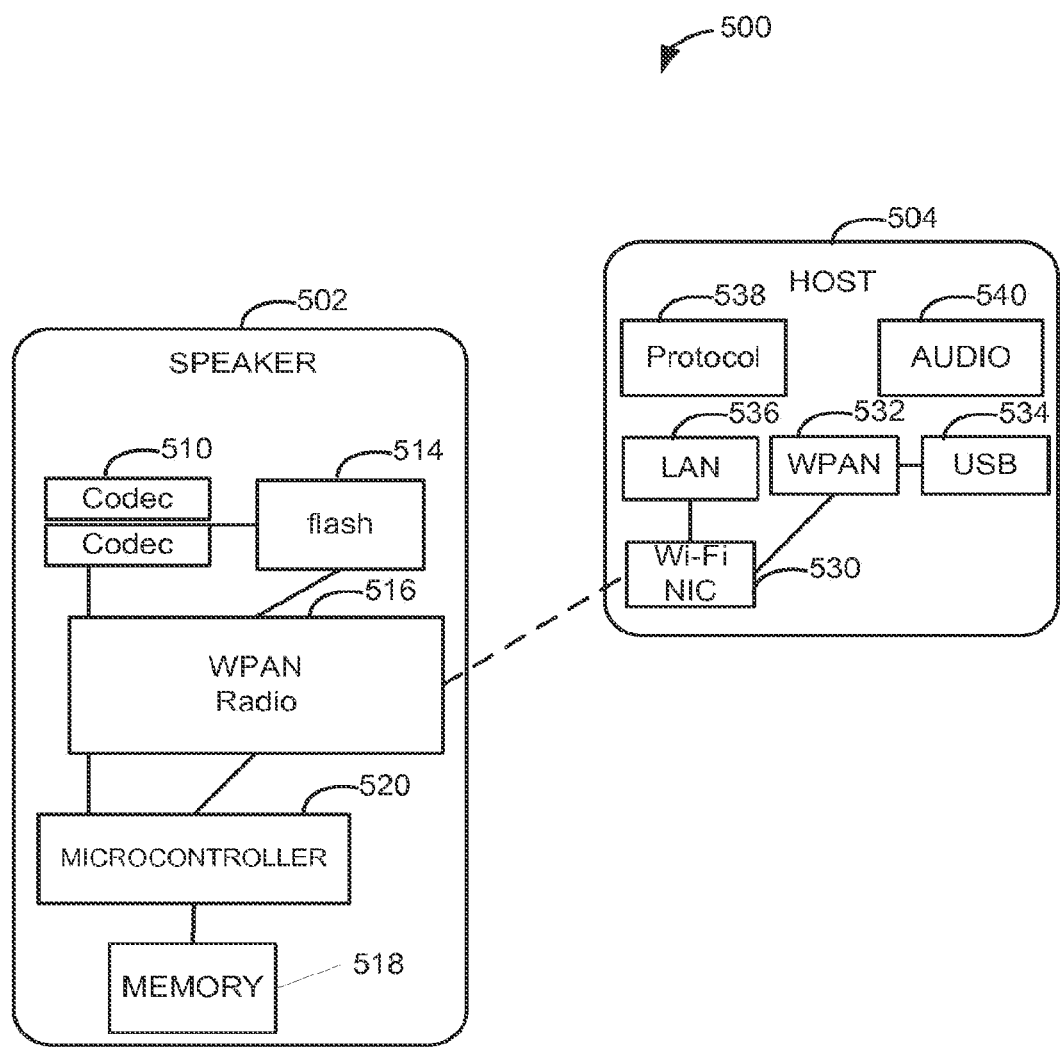
FIG. 5 is a system overview of a simple speaker application using aspects described herein.

A system overview of a simple speaker application 500 is shown in FIG. 5. A very similar architecture can apply to HID or other peripheral devices.

When the speaker 502 (or other accessory) is first purchased, it does not have a partner host. This state is known as "unpaired". A process is performed by the user to cause a secure relationship to be established between the accessory and a host computer 504. This is known as "pairing". Once paired, a specific embodiment of specially configure device will always search for its partner host device and ignore other devices. Pairing can be based on the Wi-Fi Alliance (WFA)™ Protected Setup specification (WPS)™ or a variant thereof. Different pairing mechanisms, based on different protocols or technologies such as, for example, the Near Field Communication (NFC) protocol, are also possible.

An example device, such as speaker 502, may include one or more codec 510, a speaker (or applicable I/O elements for that particular device), flash memory 514, a WPAN radio 516, a memory 518 (RAM, etc.) and a microcontroller 520 coupled to each element, if needed, for controlling device operation as directed by program instructions stored in flash memory 514.

On the host side, a standard Wi-Fi network interface 530 can be used to support the WPAN driver 532. This may be present already for use with other WLAN applications. WPAN drivers connect WPAN driver 532 to a USB function driver 534. An example of WPAN drivers are the drivers provided by Ozmo, but drivers provided by other than Ozmo can be used in place of the Ozmo drives, if proper functionality is supported. Audio data from USB audio input 540 could be conveyed to speaker 504 over the WPAN interface.

When a peripheral device, such as speaker 502, connects to its partner host device, WPAN driver 532 created an object to represent the physical device to the PnP subsystem. In response, the PnP subsystem loads the appropriate USB function drivers to handle the device. The USB function driver need not be aware that it is communicating to a peripheral device wirelessly rather than over the USB bus. Once configured, the device will obtain sensor data and pass this to the host, where it will appear like USB data to the USB function driver.

Note that while communication occurs between the device and the WPAN driver, normal WLAN traffic may continue on through the network stack to a LAN driver 536. To ensure high QoS for the peripheral application, the WLAN traffic and the WPAN can operate on the same radio channel unless the radio in the host has a very fast channel switching time.

Host Software Architecture

USB data is transferred using a USB emulation protocol 538 (implementable in a software block as illustrated) that enables the peripheral to appear as a conventional USB device in all aspects except possibly data rate and latency. This approach has at least two benefits, including allowing a standard USB function or class driver to be layered over the WPAN host drivers, and that the firmware in the application part of the peripheral will be very similar to the firmware for a USB device of the same type.

The approach need not emulate USB at the electrical level or USB frame level, but rather it does provide (1) an implementation of the USB standard control request, (2) an implementation of the USB model containing the familiar concepts, such as configurations, interfaces and endpoints, and (3) an interface at the upper edge that is compatible with that expected by Windows™ USB class and function drivers, among other benefits.

This might not provide a complete emulation of the USB stack, but only parts relevant to attached WPAN peripherals such as providing a path from a USB audio input 540 through to the peripheral speaker, wirelessly.

Figure 6:
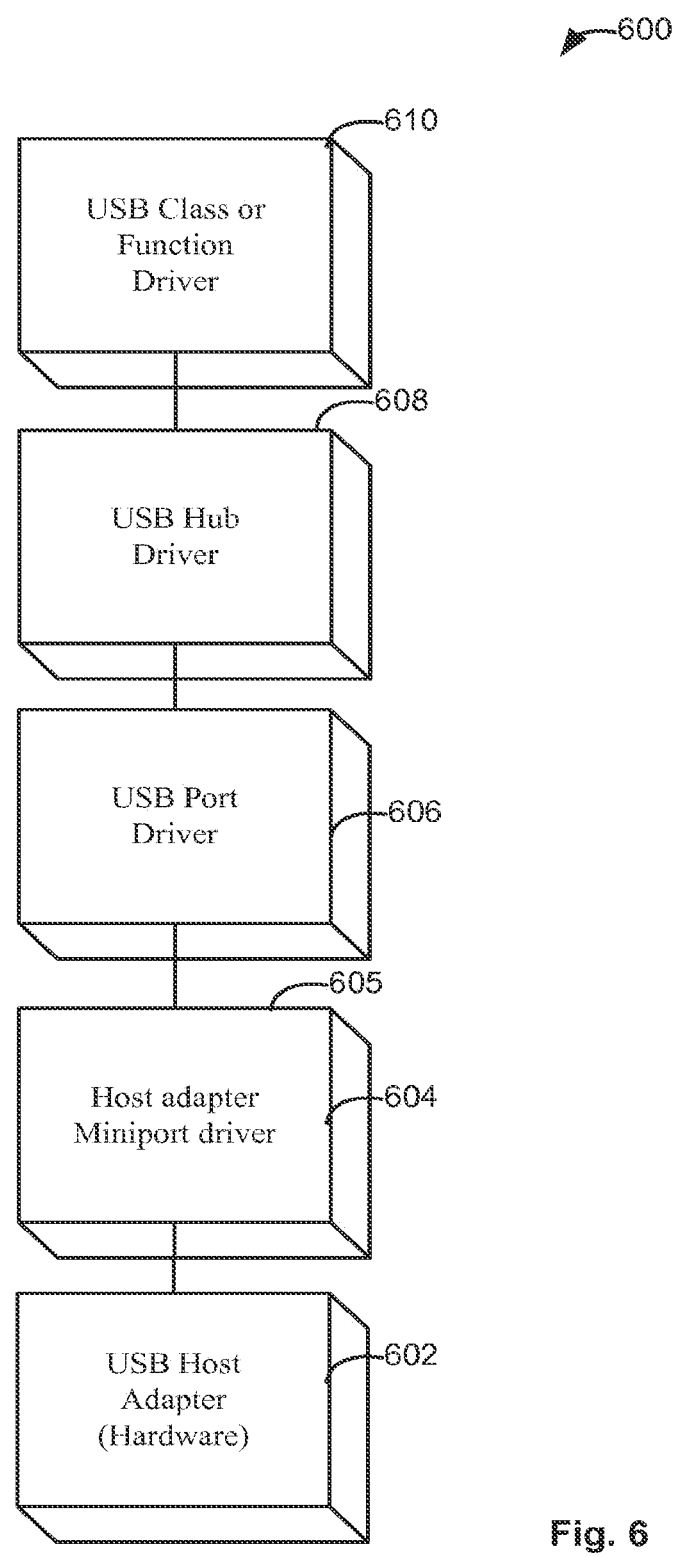
FIG. 6 is a block diagram of a typical USB stack on which the invention might be used.

FIG. 6 shows a architecture of the USB stack 600 on a Win7™ PC, as but one example.

At the bottom of the stack is a USB host adapter 602, which is a hardware component that generates that USB packets on the wire. There are various standard interfaces supported by the Win7™ for O/S host adapters. A USB host adapter miniport driver 604 drives a specific type of adapter and at the upper edge 605 provides a standard interface.

A USB port driver 606 and the USB hub driver 608 together provide generic USB stack functionality. They do not need to understand anything about specific classes of device, but provide the standard USB concepts, such as interface and endpoint. However, USB hub driver 608 does query some of the USB descriptors form the USB device and, in conjunction with the PnP manager, it determines the correct higher level driver to load.

Technically, USB hub driver 608 is a bus driver within the Windows™ Device Model (WDM) architecture and, as such, creates the physical device objects for the devices that are detected on the USB bus. These are reported to the PnP manger, which loads the appropriate function driver over the top. This function driver may either be a driver for the specific device (based on the vendor and device identifiers) or may be a generic class driver that understands how to drive all devices of a specific class.

Above a USB class or function driver 610, there may be drivers specific to a particular class of devices (not shown). For example, for a USB mouse, the standard class driver is hidusb.sys, which itself is a miniport driver within the architecture of the hidclass.sys driver. Above hidclass.sys are layered the mouhid.sys and mouclass.sys drivers that finally provide the mouse functionality to user mode applications.

Figure 7:
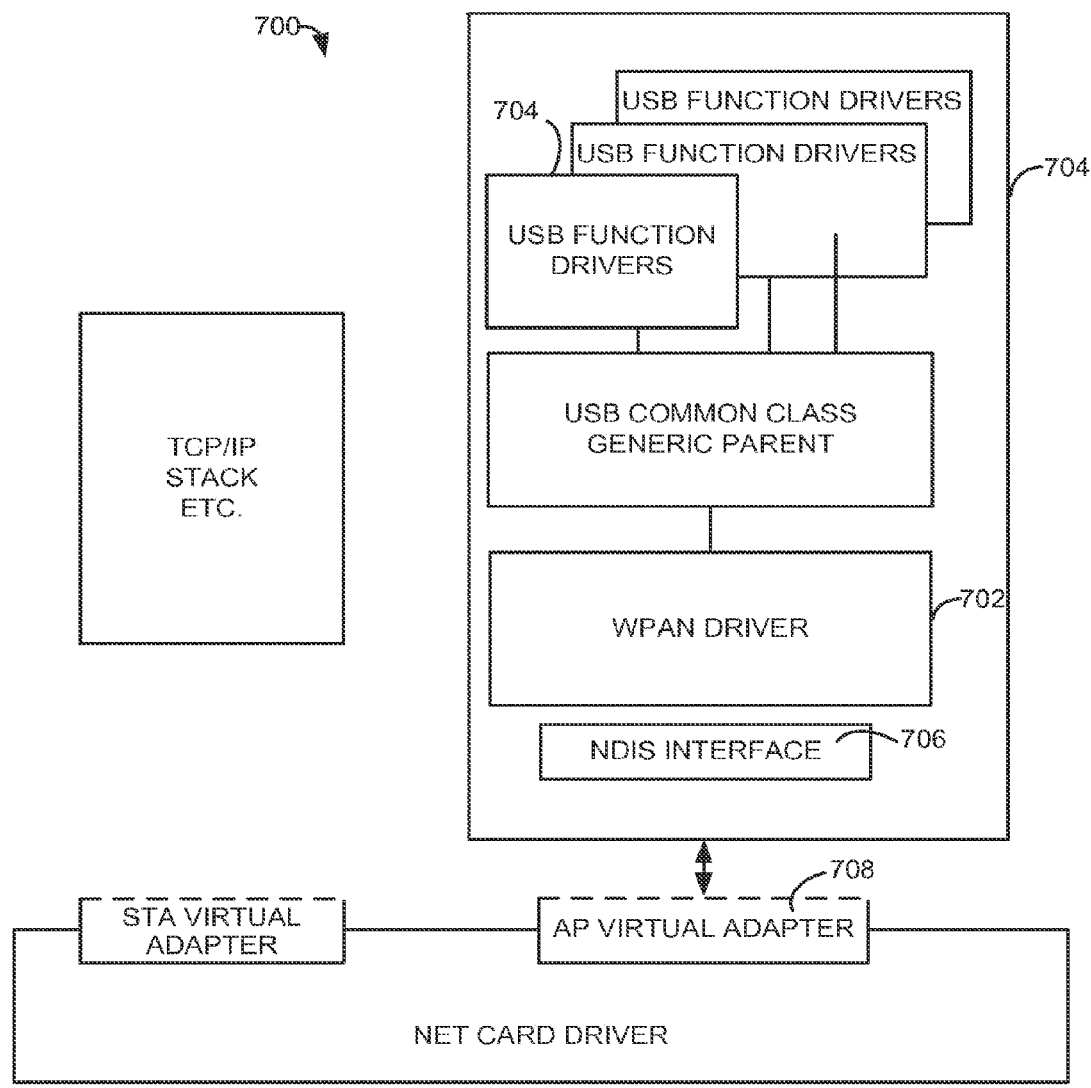
FIG. 7 is a block diagram of a driver stack.

FIG. 7 shows an example architecture 700 of a WPAN driver 702 and its relationship to 802.11 hardware and driver as might be implemented in hardware and/or software. A WPAN driver stack 704 provides the equivalent functionality of a standard USB stack, up to and including the USB hub driver.

A standard NDIS miniport WLAN driver 706 supporting SoftAP™ or Intel MyWiFi™ technology can interface to WPAN driver 702 using the AP virtual adapter 708 available under Win7™ operating system. Different implementations are also possible. As an example, WPAN driver 702 can interface to an NDIS miniport driver that implements the Wi-Fi Certified™ Wi-Fi Direct specification.

WPAN driver 702 serves as an NDIS protocol driver and as a bus driver.

WPAN driver 702 can be an NDIS protocol driver layered on top of the SoftAP™ or MyWiFi™ AP Virtual Adaptor 708 and can identify frames using the Ethertype. This driver can implement a WPAN protocol and provide encapsulation services for a USB emulation protocol. Different implementations are also possible. As an example, the encapsulation services of WPAN driver 702 can make use of the Internet Protocol (IP)

At the upper edge, the WPAN protocol driver provides an interface that can be the same as that provided by the standard USB hub driver. This means that standard class and function drivers 710 can be layered over the top of this driver.

The WPAN driver can also provide an IOCTL interface for user mode application and support a Windows™ Management and Instrumentation (WMI) interface. These interfaces enable interaction with the user through a GUI application.

The WPAN driver can act as a bus driver within the WDM architecture. As such, it creates physical device objects for peripheral in the WPAN.

The sequence of requests made to the WPAN bus driver by a function driver can vary. However, there are certain requests that are almost certain to occur. Typically, the function driver will request the device and configuration descriptors for the device. The WPAN bus driver routes this request to the WPAN protocol driver, which has already cached these from earlier so can return them directly. The function driver will select a configuration which will be routed through the WPAN protocol driver to the peripheral. At this point, the WPAN bus driver will create objects for the various interfaces supported in the configuration and also the endpoints for the default alternatives for the interfaces.

Under USB data transmission and reception, requests are made on a particular endpoint. The endpoint objects provide the queuing of USB Request Blocks (URBs) which function drivers use to make requests to the WPAN bus driver.

Once the peripheral is configured, the majority of the requests from the function driver will be for transfers on a particular endpoint. The URBs for these transfers are queued in the appropriate endpoint object. For OUT transfers, the data is forwarded to the WPAN driver for transmission. For IN transfers, the URB is queued in the endpoint awaiting the reception of data from the peripheral. When such data is received by the WPAN bus driver, it puts the data in the URB and completes the URB.

Virtual Dongle Operations

Using the hardware described above as an example, various operations of the virtual dongle will now be described. As explained, the virtual dongle can be implemented entirely in software to emulate the physical dongle (and therefore replace the need for it) such that the operating system behaves as if a physical dongle is present and being attached and detached. Thus, instead of requiring an operating system-USB driver-dongle-peripheral path, the same functions can be performed by a wireless network interface while still providing the same user experience as wired devices. In some cases, there is a physical dongle, but the virtual dongle software will alter the signaling to the operating system from the physical dongle to improve the user experience.

The "virtual dongle" software sits beside the computer's operating system and its I/O drivers, such as its USB function drivers. The I/O drivers sit between I/O devices and the operating system as a path between the I/O devices and elements of the operating system that expect inputs from those I/O devices and/or expect to be able to send outputs to those I/O Devices. For example, I/O drivers might include a keyboard input driver that receives input from a keyboard plugged into the computer and feeds those inputs to the operating system, which in turn might provide the inputs as key presses to an application program. The I/O drivers also might include a mouse input driver that receives input from a mouse plugged into the computer and feed those inputs to the operating system, which in turn might provide the inputs as mouse clicks and movements to an application program. The I/O drivers also might include a sound output driver that receives sound outputs from the operating system (which might have gotten them from a game application program that seeks to output sounds) and feeds those outputs to a sound card that, if it is connected to speaker, causes sounds to be made.

When some types of I/O devices are inserted into connectors of the computer, the operating system, possibly in conjunction with the PnP subsystem, may inform a higher level software stack specific to that device class which may decide to reroute I/O from the default device to the plugged-in device, such that the default device does not handle the I/O and the plugged-in device does. When the operating system detects the disconnection of the plugged-in device, it reverts to using the default device. An example of this is a computer with built-in speakers that play the sounds output by applications, but when a headset is plugged into the headset jack, only the headset outputs the sound.

In some conventions/systems, where the insertion of a physical dongle, rather than the connection of a wireless peripheral device itself, triggers the operating system to detect the presence of the wireless peripheral device, the operating system has no knowledge of whether or not the peripheral device itself is actually connected. As a result, the rerouting of the I/O signal to the default or to another plugged-in device upon disconnection of the wireless peripheral device cannot happen automatically. In fact, the user would have to unplug the physical dongle to force the operating system to detect a disconnection of the device and reroute the I/O back to a default or other plugged-in device.

The virtual dongle described herein can detect whether a wireless device is present and connected and, if the device is present and connected, invoke an interaction with the operating system to simulate the insertion of a hardware device, thereby allowing the operating system to switch the I/O stream from the default device to the wireless device (via the virtual dongle).

The signalling by the virtual dongle software can be done based on whether the wireless device is truly available (powered on, within range, connected, etc.), or might not exactly match availability, such as when constant and accurate availability signalling would result in an adverse user experience or would not allow maintenance of the correct or desired functionality from the perspective of the PnP subsystem. Thus, the virtual dongle may provide a "virtual disconnect" feature, software in a computer system that sits beside the computer's operating system and its I/O drivers as understood by the operating system need not be the actual I/O state. The operating system has logic to route I/O according to device state (e.g., stop looking for mouse input from a mouse that just got unplugged) and logic to provide alerts on state changes (e.g., alert the user with a visual message and/or an audio signal when a headset is unplugged or gets plugged in).

The operating system also has logic that might require certain set-up operations to occur when a device moves from a disconnected state to a connected state (such as initialization, matching, pairing, testing, handshaking, etc.). The operating system might also have logic that performs operations when a device moves from a connected state to a disconnected state (such as clearing data structures used for a connection, etc.).

With the virtual dongle, the "presented state" (what the operating system thinks is the state of the device) can vary from the "actual state." The virtual disconnect software might do this by intercepting internal device connect and disconnect messages and injecting virtual messages. For example, in some case, the virtual disconnect software chooses not to alter the states. In other cases, the virtual disconnect software might, for particular devices, maintain a presented state of "connected" even while the device is known to the virtual disconnect software to actually be disconnected. The virtual disconnect software might maintain variables and settings and buffers as needed to re-establish the connection, all while the operating system considers the device to still be connected. In some implementations, this maintenance of the presented state can be held indefinitely, held until another action takes place, or held for a specified time period. This would be useful, for example, where a device that is known to lose connections for short periods can appear, to the operating system, to be continuously connected.

In some implementations, an actual physical dongle is present but the virtual disconnect software is still used in order to improve the user experience.

The case that is used at any particular time for any particular device might be set ahead of time by the user, computer manufacturer, software program, etc., and stored in a configuration data structure, or it might be settable by the user in real-time, such as by an options switch on the computer, as part of the software or as part of the particular device.

In an example of a specific implementation, a novel physical wireless-interface dongle ("WID") has a USB connector and when it is inserted into a USB connector (usually a socket, but not required), the WID is sensed by the host USB hardware as a USB device. However, the WID need not always "present" itself to the USB hardware, but can delay that presentation. In other words, the WID need not present itself to the USB bus as a direct consequence of being plugged into the USB connector. One reason for this delayed presentation is that the WID can be a generic interface for a plurality of different devices and it delays presentation until it finds out what device it is the interface for.

The WID might be able to have a connection to the USB bus that is controlled by software by making use of a hardware feature that is commonly present in USB interface chips that allows connection to the USB bus to be controlled by software.

Once a device has wirelessly connected to the WID and provided information about what kind of device it is, the WID can then present itself to the USB bus as a USB device. At this point the WID connects to the USB bus and thereafter repackages and relays to the device the contents of the USB messages received and transmitted over the USB bus. A private protocol might be used between the dongle and the device, or a standardized protocol might be used where appropriate. Most of the information contained in the USB messages can also be contained in the messages of this private protocol, although possibly in a reformulated manner.

Some USB messages can be entirely handled by the WID without requiring assistance from the device. At any one instant, the WID represents a single USB device, but over time the WID could represent different devices, even of different classes, without the physical WID having to be removed. The WID can effect this feature by choosing when to connect or disconnect from the USB bus depending on the wireless connection with the device. This ability to serially multiplex multiple USB devices provides advantages over conventional dongles that are dedicated to single USB devices or, for example in the case of the USB Bluetooth™ or WiFi adapter, are dedicated to being network interfaces, appearing as a network card rather than as a specific device.

The virtual disconnect software (1) detects whether a wireless device is present and connected, (2) intercepts system messages related to connections and disconnections and (3) includes logic to determine which intercepted messages to forward, drop, delay or reformulate.

Using the virtual dongle, peripheral devices such as mice, keyboards and audio devices can connect to a host device using a radio that is built into the host device, such as a WiFi radio, and to then be internally connected to the USB auto-configuration software of the operating system. When a peripheral device is turned on and connects to a host device that has said software component installed, the peripheral device can operate in the same way that a conventional wired USB peripheral would operate when plugged into a USB socket.

Wireless communications to a host device are diverted internally to a software driver that is responsible to pass data and event notifications between the operating system and the peripheral device. When the peripheral device first connects, the software driver notifies the operating system about the connection. This notification is equivalent to that which occurs when a physical connector is inserted to a USB socket. The operating system reacts by invoking its PnP subsystem to investigate the function of the new device and load appropriate handling software, and also possibly rerouting signals to or from a default device and use the wireless device instead.

When the wireless device disconnects, the software driver has control of notification to the operating system. It has three options:

1) Do not provide notification to the operating system with the result that the device is not removed from the USB PnP system.

2) Provide immediate notification to the operating system with the result that the device will be removed from the USB PnP system. This may cause a "disconnect" alert sound and will require the USB PnP system to run again when the peripheral device reconnects.

3) Defer notification to the operating system for a period of time in case the wireless peripheral reconnects. In this case, the operating system will not be aware that the disconnection has occurred and will thus take no action with respect to the USB PnP system. After a disconnection, the software driver can wait for a period and, if no reconnection occurs, it can then inform the operating system about the disconnection. This "virtual unplug" function can be a substitute for a user unplugging a dongle some time after disconnecting the peripheral device. This function might also be used with physical dongles.

There might be a fourth option, in some implementations, wherein the software driver emulates some function of the peripheral device even though it is not plugged in. For example, the software driver could simulate the sending of HID reports where this was useful or appropriate.

The use of the software driver to stand between the wireless peripheral and the operating system can be used instead of a physical dongle used in many of today's products. For example, if a wireless device disconnects from a physical dongle, the operating system is not notified until the physical dongle is unplugged.

Option (1) above is similar to an approach implemented by physical dongles today, but results in a suboptimal user experience for certain wireless peripherals, such as audio headphones. Furthermore, since the virtual dongle, unlike a physical dongle, might not be easily unplugged manually by the operator to terminate an auto-configuration, this functionality is replaced.

In option (2), auto-configuration might only occur when the wireless peripheral connects and by the same token, if the device wirelessly disconnects, the operating system considers that it has been "unplugged." As a consequence, the alert sound may be made each time the peripheral connects and disconnects. This represents a significant problem for some devices such as wireless mice, which connect and disconnect frequently in order to save power.

Even for headphones, option 2 could pose problems if a disconnection occurs due to the peripheral device temporarily going out of range. If the session is terminated immediately upon disconnect, this could result in undesirable long reconnect times when the headphones are brought back into range.

The issues associated with options 1 and 2 are overcome with option 3. When a wireless peripheral connects, it informs the virtual dongle software whether it wishes to be supported by the virtual unplug function and indicates a required delay value for the virtual dongle to maintain a session after disconnection. Thus, the behaviour of the global dongle software and the virtual unplug function might be dictated by the particular devices used. The values might instead be provided by stored data objects.

The virtual dongle software can provide a token (numeric value) to identify a session. If the wireless peripheral disconnects, it may upon reconnection present the token to the virtual dongle software and, if the virtual dongle software still has the session available, it can be reconnected silently. If the session has expired, the wireless peripheral can be informed that a new session is to be established. The virtual dongle software may autonomously (without handshake form the peripheral) decide to implement a delayed notification.

Applicability of Virtual Unplug Function to Physical Dongles

To overcome certain limitations of existing physical dongles, a similar approach to options (2) and (3) above for the virtual dongle can be applied in the case where a physical dongle is present. For example, the virtual unplug function could be used with a physical dongle, using the same delaying technique with respect to notifications to the operating system. In a specific case, the "connect" notification is not provided until a wireless device communicates to the physical dongle (rather than when the dongle is plugged in). Similarly, disconnect notifications can be propagated instantaneously or be deferred for a period to allow the wireless peripheral to connect and disconnect without disturbing the operator.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclose, without departing from the essential scope and spirit of the present invention. It is intended that the invention not be limited to the particular embodiments disclosed, but that the invention will include all embodiments and equivalents falling within the scope of the claims.

What is claimed is:

1. A method comprising:
   detecting, by an input/output (I/O) routing module executing on a computer system, that a wireless input/output (I/O) device is present on a wireless channel, where the wireless I/O device is not mechanically or electrically attached to the computer system;
   in response to the detecting, simulating by the I/O routing module a physical connection of a hardware I/O device to the computer system, thereby causing an operating system of the computer system to route an I/O stream to the I/O routing module;
   routing, by the I/O routing module, the I/O stream to the wireless I/O device;
   determining that the wireless channel is inoperable and, in response to determining that the wireless channel is inoperable, deferring a notification to the operating system that the wireless I/O device has been disconnected; and
   determining that the wireless channel has returned to operability and, in response to determining that the wireless channel has returned to operability, discarding the notification to the operating system that the wireless I/O has been disconnected.

2. The method of claim 1, where simulating the physical connection comprises simulating the physical connection in response to receiving information describing the wireless I/O device from the wireless I/O device.

3. The method of claim 1, further comprising:
   receiving a token from the wireless I/O device identifying a session with the wireless I/O device;
   determining, using the token, that the session is still available; and
   reestablishing the session with the wireless I/O device.

4. The method of claim 1, further comprising:
   detecting whether the wireless I/O device is wirelessly connected or disconnected;
   intercepting computer system messages related to the connection or disconnection of the wireless I/O device; and
   determining whether to forward, drop, delay or reformulate the intercepted message.

5. The method of claim 1, where deferring the notification to the operating system comprises:
   maintaining variables or settings for reestablishing a session with the wireless I/O device.

6. The method of claim 1, where determining that the wireless channel has returned to operability comprises determining that the wireless channel has returned to operability within less than a threshold time.

7. A computer system comprising:
   one or more processors;
   memory coupled to the one or more processors and configured to store instructions, which, when executed by the one or more processors, causes the one or more processors to perform operations comprising:
   detecting, by an input/output (I/O) routing module executing on the computer system, that a wireless input/output (I/O) device is present, where the wireless I/O device is not mechanically or electrically attached to the computer system;
   in response to the detecting, simulating by the I/O routing module a physical connection of a hardware I/O device to the computer system, thereby causing an operating system of the computer system to route an I/O stream to the I/O routing module;
   routing, by the I/O routing module, the I/O stream to the wireless I/O device;

determining that the wireless channel is inoperable and, in response to determining that the wireless channel is inoperable, deferring a notification to the operating system that the wireless I/O device has been disconnected; and determining that the wireless channel has returned to operability and, in response to determining that the wireless channel has returned to operability, discarding the notification to the operating system that the wireless I/O has been disconnected.

8. The system of claim 7, where simulating the physical connection comprises simulating the physical connection in response to receiving information describing the wireless I/O device from the wireless I/O device.

9. The system of claim 7, the operations further comprising:
receiving a token from the wireless I/O device identifying a session with the wireless I/O device;
determining, using the token, that the session is still available; and
reestablishing the session with the wireless I/O device.

10. The system of claim 7, the operations further comprising:
detecting whether the wireless I/O device is present and wirelessly connected;
intercepting computer system messages related to a connection or disconnection of the wireless I/O device; and
determining whether to forward, drop, delay or reformulate the intercepted message.

11. The system of claim 7, where deferring the notification to the operating system comprises:
maintaining variables or settings for reestablishing a session with the wireless I/O device.

12. The system of claim 7, where determining that the wireless channel has returned to operability comprises determining that the wireless channel has returned to operability within less than a threshold time.

13. A non-transitory, computer-readable storage medium storing instructions, which, when executed by one or more processors, causes the one or more processors to perform operations comprising:
detecting, by an input/output (I/O) routing module executing on a computer system, that a wireless input/output (I/O) device is present, where the wireless I/O device is not mechanically or electrically attached to the computer system;
in response to the detecting, simulating by the I/O routing module a physical connection of a hardware I/O device to the computer system, thereby causing an operating system of the computer system to route an I/O stream to the I/O routing module;
routing, by the I/O routing module, the I/O stream to the wireless I/O device;
determining that the wireless channel is inoperable and, in response to determining that the wireless channel is inoperable, deferring a notification to the operating system that the wireless I/O device has been disconnected; and
determining that the wireless channel has returned to operability and, in response to determining that the wireless channel has returned to operability, discarding the notification to the operating system that the wireless I/O has been disconnected.

14. The non-transitory, computer-readable storage medium of claim 13, where simulating the physical connection comprises simulating the physical connection in response to receiving information describing the wireless I/O device from the wireless I/O device.

15. The non-transitory, computer-readable storage medium of claim 13, the operations further comprising:
receiving a token from the wireless I/O device identifying a session with the wireless I/O device;
determining, using the token, that the session is still available; and
reestablishing the session with the wireless I/O device.

16. The non-transitory, computer-readable storage medium of claim 13, the operations further comprising:
detecting whether the wireless I/O device is present and wirelessly connected;
intercepting computer system messages related to a connection or disconnection of the wireless I/O device; and
determining whether to forward, drop, delay or reformulate the intercepted message.

17. The non-transitory, computer-readable storage medium of claim 13, where deferring the notification to the operating system comprises:
maintaining variables or settings for reestablishing a session with the wireless I/O device.

18. The non-transitory, computer-readable storage medium of claim 13, where determining that the wireless channel has returned to operability comprises determining that the wireless channel has returned to operability within less than a threshold time.

* * * * *

UNITED STATES PATENT AND TRADEMARK OFFICE
CERTIFICATE OF CORRECTION

PATENT NO. : 9,052,739 B2
APPLICATION NO. : 13/888262
DATED : June 9, 2015
INVENTOR(S) : Edney It is certified that error appears in the above-identified patent and that said Letters Patent is hereby corrected as shown below:

In the specification

Column 1 Line 8-11 below "CROSS-REFERENCES TO RELATED APPLICATIONS" delete "This application is a continuation . . .entirety for all purposes.".

Column 1 Line 13 delete "13/888,262 filed May 6, 2013," and insert --13/168,435 filed on June 24, 2011,--, therefor.

Column 1 Line 46 delete "ask" and insert --ask for--, therefor.

Column 1 Line 54 delete "notebooks," and insert --notebooks, netbooks,--, therefor.

Column 1 Line 56 delete "phone" and insert --phones--, therefor.

Column 1 Line 57 delete "plus," and insert --plug,--, therefor.

Column 2 Line 2 delete "key boards," and insert --keyboards,--, therefor.

Column 2 Line 5 delete "communicated" and insert --communicates--, therefor.

Column 2 Line 8 delete "action." and insert --actions.--, therefor.

Column 2 Line 16 delete "may" and insert --many--, therefor.

Column 2 Line 20 delete ""connecting" and insert --"connection--, therefor.

Column 2 Line 22 delete "system," and insert --systems,--, therefor.

Column 2 Line 23 delete "a" and insert --as--, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 9,052,739 B2

Column 2 Line 45 delete "devices" and insert --devices.--, therefor.

Column 3 Line 24 delete "stimulates" and insert --simulates--, therefor.

Column 3 Line 38 delete "by" and insert --but--, therefor.

Column 5 Line 58 delete "interfacing" and insert --interfacing)--, therefor.

Column 6 Line 27 delete "Not" and insert --Note--, therefor.

Column 6 Line 43 delete "to" and insert --to the--, therefor.

Column 7 Line 4 delete "with" and insert --with a--, therefor.

Column 7 Line 10 delete "and" and insert --an--, therefor.

Column 7 Line 25 delete "manger" and insert --manager--, therefor.

Column 7 Line 35 delete "configure" and insert --configured--, therefor.

Column 7 Line 55 delete "drives," and insert --drivers,--, therefor.

Column 7 Line 59 delete "created" and insert --creates--, therefor.

Column 8 Line 20 delete "request," and insert --requests,--, therefor.

Column 8 Line 33 delete "that" and insert --the--, therefor.

Column 8 Line 43 delete "form" and insert --from--, therefor.

Column 8 Line 50 delete "manger," and insert --manager,--, therefor.

Column 9 Line 11 delete "Adaptor" and insert --Adapter--, therefor.

Column 9 Line 17 delete "(IP)" and insert --(IP).--, therefor.

Column 9 Line 28 delete "peripheral" and insert --peripherals--, therefor.

Column 10 Line 7 delete "Devices." and insert --devices.--, therefor.

Column 10 Line 13 delete "feed" and insert --feeds--, therefor.

Column 10 Line 20 delete "speaker," and insert --speakers,--, therefor.

Column 10 Line 39 delete "signal" and insert --signals--, therefor.

CERTIFICATE OF CORRECTION (continued)
U.S. Pat. No. 9,052,739 B2

Column 10 Line 61 delete "drivers" and insert --drivers and can control status messages relating to I/O devices so that the state of an I/O device--, therefor.

Column 11 Line 13 delete "case," and insert --cases, the virtual disconnect software will have the presented state equal to the actual state, i.e.,--, therefor.

Column 13 Line 22 delete "undesirable" and insert --undesirably--, therefor.

Column 13 Line 40 delete "form" and insert --from--, therefor.

Column 13 Line 62 delete "disclose," and insert --disclosed,--, therefor.